United States Patent [19]

Papastavros

[11] Patent Number: 4,502,277
[45] Date of Patent: Mar. 5, 1985

[54] TURBINE POWER PLANT SYSTEM

[76] Inventor: Demos Papastavros, 2429 NE. 184th Ter., North Miami Beach, Fla. 33160

[21] Appl. No.: 573,703

[22] Filed: Jan. 25, 1984

[51] Int. Cl.$^3$ .............................................. F02C 6/18
[52] U.S. Cl. ............................. 60/39.181; 60/39.182; 60/39.41
[58] Field of Search ............. 60/39.181, 39.182, 39.41, 60/650, 651

[56] References Cited

U.S. PATENT DOCUMENTS

| | | | |
|---|---|---|---|
| 3,007,306 | 11/1961 | Martin et al. | 60/39.181 |
| 3,436,911 | 4/1969 | Squires | 60/39.181 |
| 4,184,325 | 1/1980 | Mandrin | 60/39.181 |
| 4,267,692 | 5/1981 | Earnest | 60/39.181 |

Primary Examiner—Louis J. Casaregola

[57] ABSTRACT

A turbine power plant system consisting of three sub-systems; a gas turbine sub-system, an exhaust turbine sub-system, and a steam turbine sub-system. The three turbine sub-systems use one external fuel source which is used to drive the turbine of the gas turbine sub-system. Hot exhaust fluid from the gas turbine sub-system is used to drive the turbines of the exhaust turbine sub-system and heat energy from the combustion chamber of the gas turbine sub-system is used to drive the turbine of the steam turbine sub-system. Each sub-system has a generator.

In the gas turbine sub-system, air flows through several compressors and a combustion chamber and drives the gas turbine.

In the exhaust turbine sub-system, hot exhaust fluid from the gas turbine sub-system flows into the second passageway arrangement of first and fourth heat exchangers and thus transfering the heat energy to the first passageway arrangement of the first and fourth heat exchangers which are connected to the inlets of first and second turbines, thus driving them. Each turbine has its own closed loop fluid cycle which consists of the turbine and three heat exchangers and which uses a fluid which boils at low temperatures. A cooler is connected to a corresponding compressor which forms another closed loop system and is used to cool the exhaust fluid from each of the two above mentioned turbines. In the steam turbine sub-system, hot fluid is used to drive the steam turbine and then it flows through a fluid duct, to a first compressor, the first fluid passageway arrangement of first and second heat exchangers, the second passageway of the first heat exchanger, the combustion chamber of the gas turbine where it receives heat energy, and then finally to the inlet of the steam turbine, all in one closed loop fluid cycle. A cooler is connected to the second passageway of the second heat exchanger in a closed loop fluid cycle, which is used to cool the turbine exhaust.

4 Claims, 2 Drawing Figures

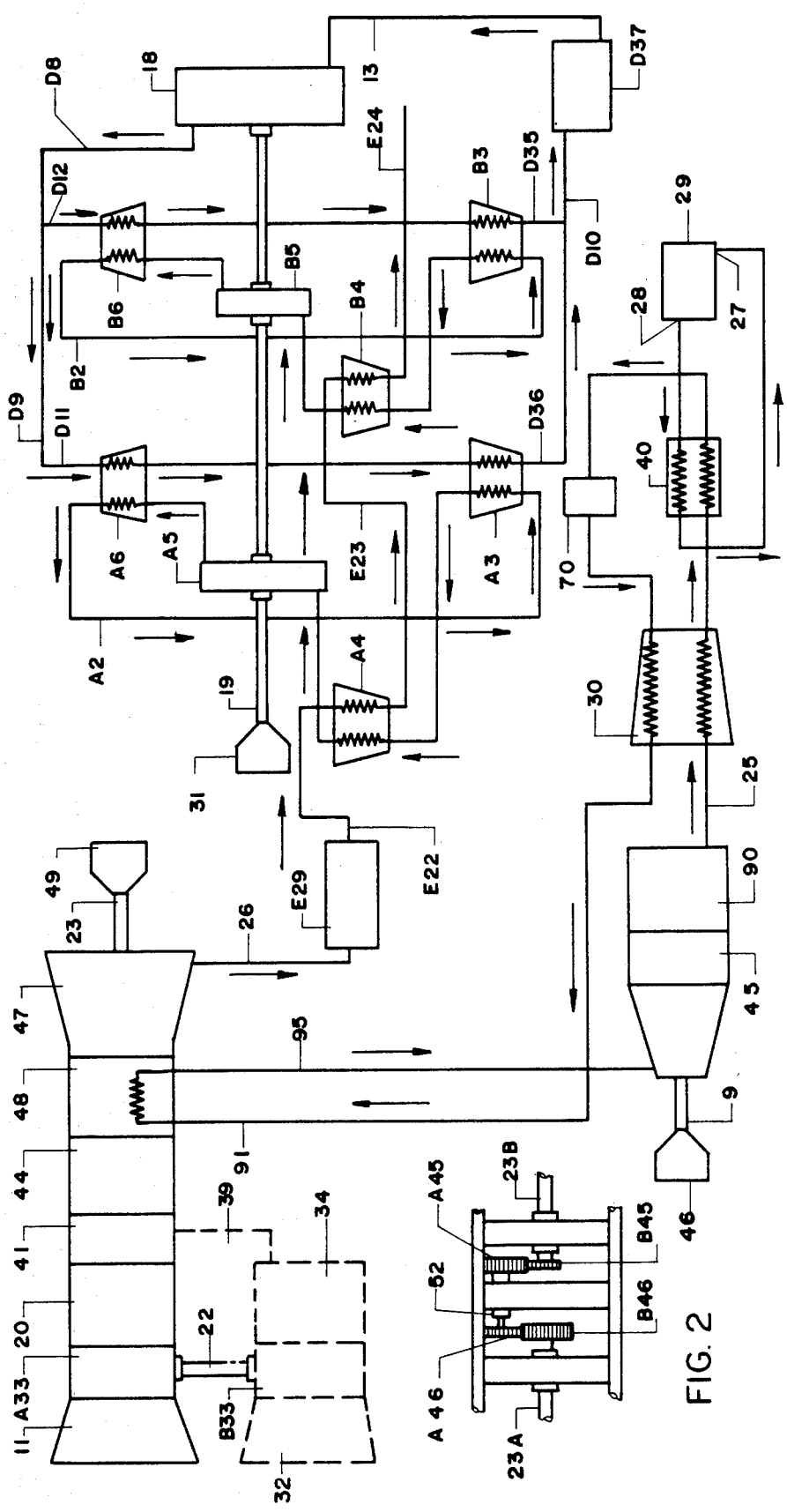

TURBINE POWER PLANT SYSTEM

SUMMARY OF THE INVENTION

This invention relates to an energy producing system, such as which can be used by a public utility, which has a gas turbine sub-system, exhaust turbine sub-system and a steam turbine sub-system to generate electricity.

A principal objective of this invention is to provide a novel energy producing system having turbines, heat exchangers and compressors arranged in a novel manner for improved efficiency and minimum energy consumption.

Another objective of this invention is to provide a novel energy producing system which has three turbine power plant sub-systems and uses one external fuel source. Each turbine sub-system has one generator.

Further objectives and advantages of this invention will be apparent from the following detailed description of a presently preferred embodiment, which is illustrated schematically in the accompanying drawings.

Preferably, the present energy producing system comprises:

(A) a gas turbine sub-system which operates on energy provided by an external fuel source and consists of;
  (1) a first compressor, second compressor, third compressor, combustion chamber, turbine and generator mounted on the same shaft;
  (2) a fluid connection from the outlet of the gas turbine sub-system to the inlet of the exhaust turbine sub-system;
  (3) a fluid connection from the combustion chamber to the inlet of the steam turbine sub-system;
  (4) a fluid connection from the combustion chamber to the second passageway of the first heat exchanger in the steam turbine sub-system;

(B) an exhaust turbine sub-system which receives hot exhaust fluid from the gas turbine sub-system and consists of:
  (1) a generator, first turbine, second turbine and second compressor mounted on the same shaft;
  (2) a first compressor having a fluid connection to the second passageway of the first and fourth heat exchangers;
  (3) a first, second, and third heat exchanger, each having a first passageway which is in a closed loop conduit fluid cycle with the first turbine;
  (4) a fourth, fifth and sixth heat exchanger, each having a first passageway which is in a closed loop conduit fluid cycle with the second turbine;
  (5) a cooler and second compressor in a closed loop cycle with the second passageway of the second, third, fifth and sixth heat exchangers;

(C) a steam turbine sub-system arranged in a closed loop cycle which receives heat energy from the combustion chamber of the gas turbine sub-system and consists of:
  (1) a generator and a steam turbine with a first compressor in the same housing mounted on the same shaft;
  (2) a first and second heat exchanger each having a first passageway which receives fluid from the first compressor;
  (3) a second heat exchanger having a fluid connection from its first passageway to the second compressor;
  (4) a second compressor having a fluid connection to the second passageway of the first heat exchanger;
  (5) a fluid connection between the second passageway of the first heat exchanger, the combustion chamber of the gas turbine sub-system and the turbine inlet of the steam turbine sub-system all in a closed loop cycle;
  (6) a cooler having a fliuid connection to the second passageway of the second heat exchanger all in a closed loop fluid cycle.

DESCRIPTION OF THE DRAWING

FIG. 1 shows schematically the gas turbine sub-system, exhaust turbine sub-system and steam turbine sub-system in accordance with the present invention.

FIG. 2 shows schematically a cross section of the gears in the core of the fluid duct of the steam turbine sub-system.

Before explaining the diclosed embodiment of the present invention in detail it is to be understood that the invention is not limited in its application to the details of the particular arrangement shown since the invention is capable of other embodiments. Also, the terminology used herin is for the purpose of description and not limitation.

DETAILED DESCRIPTION

FIG. 1 consists of three sections representing the gas turbine sub-system, exhaust turbine sub-system and steam turbine sub-system which operate as one energy producing system. The gas turbine sub-system consists of the first compressor 11, second compressor 20, third compressor 44, combustion chamber 48 followed by turbine 47, whose respective rotors are mounted on a common rotary shaft 23. Fluid ducts A33 and 41 form circular air passageways which allow air to flow through the adjoining component. A starting device is located between the first and second compressor (not shown). The starter is connected to shaft 22 which is allowed to engage with shaft 23 from the first compressor and second compressor at A33 (not shown). Additional compressors 32 and 34 may be used to provide more compressed air if desired. Shaft 22 is allowed to engage with the shaft from compressors 32 and 34 at point B-33 using the same principle as the shaft from compressors 11 and 20 at point A33. Conduit 39 allows the compressed air to flow from the outlet of compressor 34 to fluid duct 41 where it mixes with the compressed air in the passageway. Air passes through compressor 44 into the combustion chamber 48 where the combustion process takes place and then on to turbine 47. It should be noted that the amount of pressure at the outlet of compressor 11 will be equal to the pressure in fluid duct A33 and the pressure at the outlet of compressor 20 will be equal to the pressure in fluid duct 41. It should also be noted that starting devices are attached to the exhaust turbine sub-system and steam turbine sub-system (not shown).

Referring to the exhaust turbine sub-system, the hot exhaust from the gas turbine sub-system enters conduit 26 which is linked to the first comprssor E-29 where the hot exhaust is compressed. The hot exhaust exits into conduit E-22 and enters the second fluid passageway of the first heat exchanger A-4. The second fluid passageway has a fluid outlet which is connected to conduit E-23. The warm exhaust travels through conduit E-23 and enters the second fluid passageway of the fourth heat exchanger B-4. The warm exhaust flows through the fourth heat exchanger B-4 and enters conduit E-24 which will release the cooled exhaust into the atmosphere. During this process, the heat from the exhaust will have been transferred to the fluid flowing in an opposite direction in the first fluid passageway of the first and fourth heat exchangers, A4 and B4 respectively.

Additionally, the exhaust turbine sub-system consists of the first turbine A5 and second turbine B5 each with a separate closed conduit fluid loop cycle mounted on a single rotary shaft 19. The first turbine A5 has a fluid outlet which is connected to the first fluid passageway arrangement of the second heat exchanger A6 by a conduit. The fluid flows through the first passageway arrangement to conduit A2. The fluid travels through conduit A2 to the first fluid passageway arrangement of the third heat exchanger A3. The fluid flows from the outlet of A3 into the conduit which is connected to the first fluid passageway arrangement of the first heat exchanger A4. The outlet of the first fluid passageway arrangement of the first heat exchanger A4 is connected to the inlet of the first turbine A5 by conduit. The closed loop fluid cycle of the second turbine B5 follows the same principle as that of the first turbine A5. Fluid flows from the turbine outlet of B5 into the first fluid passageway arrangement of the fifth heat exchanger B6, then through conduit B2, which is connected to the first fluid passageway arrangement of the sixth heat exchanger B3. The fluid flows from the sixth heat exchanger B3 to the first fluid passageway arrangement of the fourth heat exchanger B4 via a fluid conduit. The fluid from the first passageway of the fourth heat exchanger B4 flows to the inlet of turbine B5. The exhaust turbine sub-system also consists of an externally powered cooler D37 which cools and circulates the fluid through the closed loop cycle and has a fluid inlet and outlet. The cooler is connected to the second compressor 18 by a fluid conduit 13. Compressor 18, which is similar to turbines A-5 and B-5, regulates the fluid velocity and maintains a constant pressure, it is mounted on shaft 19 as are the two turbines. Once regulated, the fluid flows through conduit D8 and D9 which are connected to the second fluid passageway arrangements of the second heat exchanger A6 and fifth heat exchanger B6 at fluid inlets D11 and D12 respectively. The fluid flows through the heat exchangers entering the conduits which are connected to the second fluid passageway arrangement of the third heat exchanger A3 and sixth heat exchanger B3. The fluid exits the third and sixth heat exchangers at outlet D36 and D35 respectively and enters conduit D10 which flows back to the inlet of cooler D37. The first turbine closed loop cycle will have conduits which are larger in diameter than those of the second turbine closed loop cycle due to the fact that fluid in the first turbine will have a higher temperature than that of the second turbine. The conduits in the closed loop cycle have different sizes (in diameter) depending on the temperature and stage that the fluid is in. The two turbine closed loop cycles used a fluid which boils at low temperatures.

Refering now to the steam turbine sub-system which forms a closed loop fluid cycle. Fluid in a gaseous phase flows through conduit 95 into the turbine compressor unit 90, consisting of a turbine, fluid duct and first compressor, and exits into the conduit 25 which is connected to the first fluid passageway arrangement in the first heat exchanger 30. The fluid leaves the first exchanger and flows through the first fluid passageway arrangement of the second heat exchanger 40, where it is converted to a liquid phase and flows to the second compressor 70 via a fluid conduit. The fluid is compressed and then preheated as it flows through the second fluid passageway arrangement of the first heat exchanger 30. The fluid flows into the combustion chamber 48 of the gas turbine sub-system via conduit 91 where the heat produced in the combustion process will further heat the fluid. As previously mentioned the steam turbine sub-system is a closed loop cycle and the fluid of the steam turbine sub-system does not mix with and the fluid of the gas turbine sub system.

An external powered cooler 29 with fluid inlet 27 and outlet 28 is used to cool the hot fluid in the first passageway by cooling and circulating the fluid through the second fluid passageway arrangement of the second heat exchanger 40. It should be noted that the turbine and compressor which are housed as one unit may be housed as two separate units and an external heater may be used to heat the fluid instead of passing fluid between the combustion chamber 48. The fluid duct 45 serves as a fluid passageway connecting the turbine outlet to the compressor. 90 The core of fluid duct 45 of the steam turbine sub-system contain a series of gears shown in detail in FIG. 2. Referring to FIG. 2, gears A-46 and A-45 are are connected to a common shaft 52. Gears B-46 and B-45 are connected to shaft 23a and 23b respectively. The difference in the size of the gears allow the compressor to rotate at a higher rate of speed than the turbine. Shaft 23a and 23b are connected to the shaft of the turbine and first compressor respectively (not shown).

There are many other heating sources ranging from solar to geothermal and various arrangement of component which may be used in different conditions which are not presented at this time for purpose of simplicity of this presentation.

Each of the three turbine sub-systems have generators connected to the common shafts. Generator 49 is connected to shaft 23 in the gas turbine sub-system. Generator 31 is connected to shaft 19 in the exhaust turbine sub-system. Generator 46 is connected to shaft 9 in the steam turbine sub-system. Relief valves may be placed in various locations of the turbine power plant system to relieve any excess fluid pressure which may develop or pass excess fluid to a storage tank (not shown).

I claim:

1. In a turbine power plant system having a gas turbine sub-system, exhaust turbine sub-system and steam turbine sub-system;

a gas turbine sub-system which comprises the combination of:

a first compressor, first fluid duct, second compressor, second fluid duct, third compressor, combustion chamber and gas turbine each having a fluid inlet and outlet means operatively connecting said items to each other in the above mentioned sequence, each located in the same housing means and each mounted on a common shaft;

a generator means operatively connected to said common shaft;

an exhaust turbine sub-system which comprises the combination of:

a first compressor having a fluid inlet, fluid outlet and compressing means between its inlet and outlet for compressing fluid;

a first turbine, second turbine and second compressor each having a fluid inlet and outlet and each mounted on a common shaft;

a generator means operatively connected to said common shaft;

a first, second, third, fourth, fifth, and sixth heat exchanger each having a first fluid passageway arrangement having a fluid inlet and outlet at opposite ends and a second passageway arrangement having a fluid inlet and outlet at opposite ends, wherein the fluid flow in said second passageway arrangement is opposite to the fluid flow in said first fluid passageway arrangement allowing for a heat exchange relationship;

a cooler having a fluid inlet, fluid outlet, and cooling means between its inlet and outlet for cooling and circulating fluid;

a fluid conduit means operatively connecting the outlet of said turbine of the gas turbine sub-system to the inlet of said first compressor of the exhaust turbine sub-system, said fluid conduit means receiving hot exhaust fluid from the gas turbine sub-system which provides heat energy to drive the said first turbine and second turbine of the exhaust turbine sub-system;

a fluid conduit means operatively connecting the outlet of said first compressor to the inlet of said second passageway arrangement of the first heat exchanger;

a fluid conduit means operatively connecting the outlet of said second passageway arrangement of the first heat exchanger to the inlet of the second passageway arrangement of the fourth heat exchanger;

a fluid conduit means allowing the fluid flowing from the outlet of said second passageway arrangement of the fourth heat exchanger to be released into the atmosphere;

a fluid conduit means operatively connecting the following in a closed loop fluid cycle, the outlet of the said first passageway arrangement of the first heat exchanger to the inlet of the of said first turbine, the outlet of said first turbine to the inlet of said first passageway arrangement of the second heat exchanger, the outlet of said first passageway arrangement of the second heat exchanger to the inlet of the first passageway arrangement of the third heat exchanger, the outlet of the first passageway arrangement of the third heat exchanger to the inlet of said first passageway arrangement of the first heat exchanger;

a fluid conduit means operatively connecting the following in a closed loop fluid cycle, the outlet of said first passageway arrangement of the fourth heat exchanger to the inlet of said second turbine, the outlet of said second turbine to the inlet of said first fluid passageway arrangement of the fifth heat exchanger, the outlet of said first fluid passageway arrangement of the fifth heat heat exchanger to the inlet of said first fluid passageway arrangement of the sixth heat exchanger, the outlet of said first fluid passageway arrangement of the sixth heat exchanger to the inlet of said first fluid passageway arrangement of the fourth heat exchanger;

a fluid conduit means operatively connecting the following in a closed loop cycle, the outlet of said cooler to the inlet of said second compressor, the outlet of said second compressor to the inlet of said second passageway arrangement of the second and fifth heat exchangers, the outlet of the second and fifth heat exchangers to the inlet of said second passageway arrangement of the third and sixth heat exchangers, the outlet of said second passageway arrangement of the third and sixth heat exchangers to the inlet of said cooler;

a steam turbine sub-system which comprises the combination of;

a turbine, fluid duct and first compressor each having a fluid inlet and outlet means operatively connecting said items in the above mentioned sequence, each located in the same housing means and each mounted on a common shaft;

a generator means operatively connected to said common shaft;

a first and second heat exchanger each having a first fluid passageway arrangement having a fluid inlet and outlet at opposite ends and a second fluid passageway arrangement having a fluid inlet and outlet at opposite ends, wherein the fluid flow in said second passageway arrangement is opposite to the fluid flow in said first passageway arrangement allowing for a heat exchange relationship;

a cooler having a fluid inlet, a fluid outlet and a cooling and circulating means between its inlet and outlet;

a second compressor having a fluid inlet, a fluid outlet and a compressing means between its inlet and outlet;

a fluid conduit means operatively connecting the outlet of said second passageway arrangement of the first heat exchanger to the inlet of said turbine, said fluid conduit means passing through the combustion chamber of the gas turbine sub-system allowing the fluid to receive heat energy from said combustion chamber inorder to drive said turbine of the steam turbine sub-system;

a means operatively conncting the outlet of said turbine to the inlet of said fluid duct;

a means operatively connecting the outlet of said fluid duct to the inlet of said first compressor;

a means operatively connecting the outlet of said first compressor to the inlet of the first passageway arrangement of the first heat exchanger;

a fluid conduit means operatively connecting the outlet of said first passageway arrangement of the first heat exchanger to the inlet of said first passageway arrangement of the second heat exchanger;

a fluid conduit means operatively connecting the outlet of the first passageway arrangement of the second heat exchanger to the inlet of said second compressor;

a fluid conduit means operatively connecting the outlet of said second compressor to the inlet of said second passageway arrangement of the first heat exchanger;

a fluid conduit means operatively connecting the following in a closed loop cycle, the outlet of said cooler to the inlet of the second passageway arrangement of the second heat exchanger, the outlet of said second passageway arrangement of the second heat exchanger to the inlet of said cooler;

2. A turbine power plant system according to claim 1, and further comprising a means for heating the fluid flowing between the inlet and outlet of said combustion chamber of the gas turbine sub-system.

3. A turbine power plant system according to claim 1, and further comprising an external starter means for each turbine sub-system.

4. A turbine power plant system according to claim 1 in which an external energy source is used to drive the gas turbine sub-system and heat energy provided by the gas turbine sub-system is used to drive the exhaust turbine sub-system and steam turbine sub-system.

* * * * *